Jan. 21, 1958 A. H. IVERSEN 2,820,720
GLASS-BONDED FERRITE
Filed Sept. 15, 1954 3 Sheets-Sheet 1
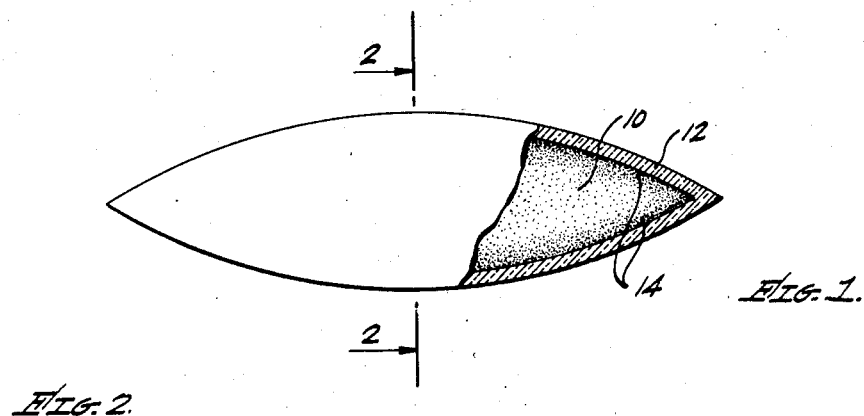
FIG. 1.
FIG. 2.
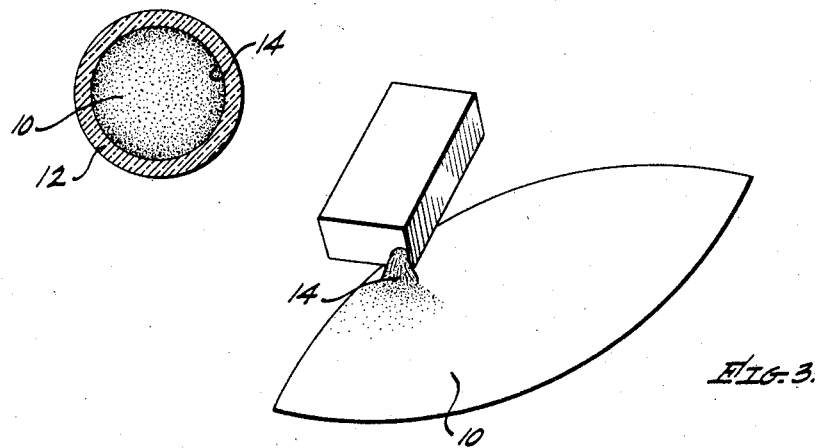
FIG. 3.
FIG. 4.
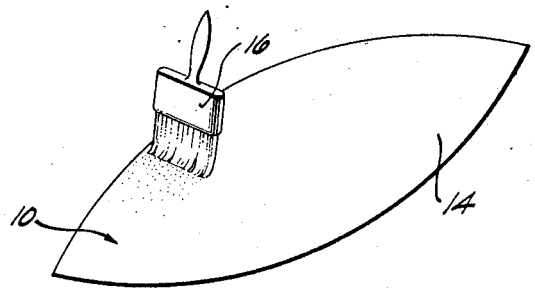
INVENTOR.
ARTHUR H. IVERSEN.
BY
Henry Hayman
ATTORNEY.

Jan. 21, 1958  A. H. IVERSEN  2,820,720
GLASS-BONDED FERRITE
Filed Sept. 15, 1954  3 Sheets-Sheet 2

INVENTOR.
ARTHUR H. IVERSEN,
BY
ATTORNEY.

United States Patent Office 2,820,720
Patented Jan. 21, 1958

---

2,820,720

GLASS-BONDED FERRITE

Arthur H. Iversen, Santa Monica, Calif., assignor to Hughes Aircraft Company, Culver City, Calif., a corporation of Delaware Application September 15, 1954, Serial No. 456,187

6 Claims. (Cl. 117—65)

This invention relates to vitreous-coated ceramics and more particularly to a glass bond for porous magnetic materials and a method of making such a bond.

At microwave frequencies ferromagnetic ceramic structures commonly called ferrites are employed to advantage in several different ways, one of which is described and claimed in a copending application Serial No. 419,259 by Willard A. Hughes, filed March 29, 1954, entitled "Waveguide Isolator." Ferrites generally consist of a mixture of the oxides of various bivalent metals with ferric oxide, $Fe_2O_3$. The general formula of a ferrite is $Me_1:Me_2:Fe_2O_3$, where $Me_1$ may be a metal such as nickel, copper, manganese or magnesium and where $Me_2$ may be a metal such as zinc or cadmium. A ferrite body may be produced by intimately mixing finely divided particles of the metallic oxides, compacting the mixture by compression molding and heating it to a temperature of between 1,000 and 1,600 degrees centigrade.

It has been found desirable to hermetically seal the ferrite disclosed in the aforementioned Hughes application because the presence of moisture within it adversely affects its performance. To this end a method of coating the ferrite with glass has been devised which is described and claimed in copending application Serial No. 430,841 by Arthur H. Iversen, filed May 19, 1954, entitled "Vitreous Coated Magnetic Material," of which the instant application is a continuation-in-part.

A method of sealing a porous ferrite for preventing the escape of moisture and occluded gases from a ferrite body in a high-vacuum electron tube was disclosed in the Iversen application. This method employs the use of two glasses having substantially different sintering temperatures. The glass having the high sintering temperature is sintered on the ferrite body first to fill totally or partially the largest of the ferrite pores. The second glass is then sintered over the first. This method is very useful in hermetically sealing porous ferrite bodies for use in vacuum tubes. The method is also useful in sealing the ferrite body disclosed in the Hughes application; however, in that application the use of a single thin layer of a low-loss glass is often desirable.

An object of the invention is therefore to provide a bond between a porous ferrite and a thin glass coating having a low-loss and a method of providing such a bond.

In accordance with the present invention a small amount of dielectric or ferrite powder is applied to the outer surface of a ferrite body and sintered there. After the ferrite body is allowed to cool a suitable glass is flowed over the sintered dielectric surface. The dielectric powder, when sintered, closes the large pores of the ferrite body and prevents the molten glass from "soaking in." The amount and thickness of the glass needed to effectively seal the ferrite body and therefore the loss of the composite structure is thereby reduced.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Fig. 1 is an elevational view, partly in section, of a glass bonded ferrite;

Fig. 2 is a sectional view on the line 2—2 of Fig. 1;

Fig. 3 illustrates one step in the improved method of coating a porous ferrite body with glass;

Fig. 4 shows another step in the method of bonding glass to a ferrite body;

Figure 5:
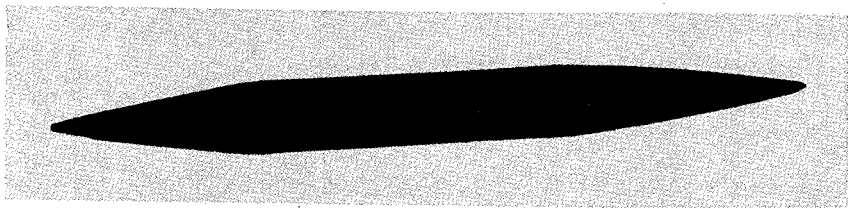
Figs. 5, 6 and 7 are photographs of the ferrite body in various stages of manufacture.

Referring to the drawing, in Fig. 1 a ferrite body 10 is shown having a configuration such as an ovaloid shape suitable for use in a waveguide isolator such as that disclosed in the aforementioned Hughes application. The ferrite body 10, which is encased by a glass coating 12, has a dense interface layer of a dielectric material 14. The dielectric material 14 may be constituted of a sintered layer of a finely ground or ball-milled powder of the ferrite material itself having a particle size equal to, for example, five microns. The ferrite body 10, glass coating 12 and dielectric layer 14 are likewise exhibited in the sectional view of the glass bonded ferrite structure in Fig. 2.

Figure 6:
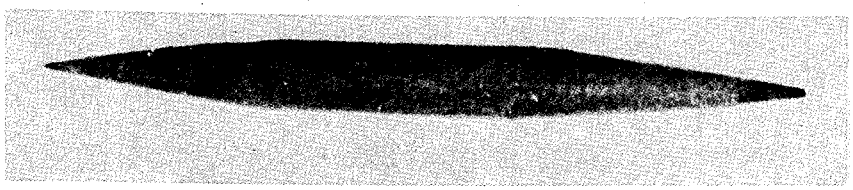
Figure 7:
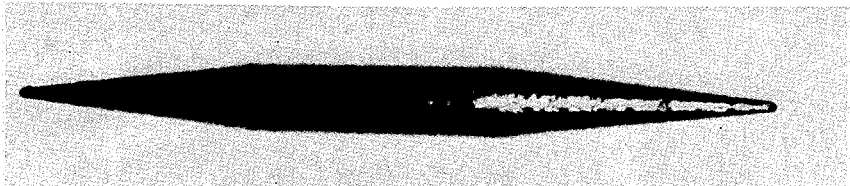

The ferrite body 10 is generally formed in a furnace by a sintering process which normally takes place at about 1300 degrees centigrade. The ferrite body 10, a photograph of which is shown in Fig. 5, may be "dusted" with the dielectric powder 14 as illustrated in Fig. 3. Alternatively, the dielectric powder 14 may be suspended in water or alcohol and painted or sprayed on the ferrite body 10. The dielectric powder 14 is then sintered at a temperature less than the sintering temperature of the ferrite body 10, say 1000 degrees centigrade. This is done to prevent grain growth in the ferrite body 10 which may produce an undesirable change in its magnetic properties. A photograph of the ferrite body 10 with a sintered dielectric surface is shown in Fig. 6. The dielectric powder 14 then forms a relatively non-porous interface layer over the ferrite body 10. The glass 12, in a powdered form is suspended in a suitable fluid medium such as water or alcohol and the suspension is applied to the non-porous sintered dielectric surface 14 of the ferrite body 10 by brush 16 as shown in Fig. 4. The ferrite body 10 may, of course, alternatively be sprayed with the powdered glass suspension. The glass 12 itself is then sintered about the dielectric layer 14 of the ferrite body 10 at a temperature less than the sintering temperature of the dielectric powder 14, e. g. at 700 degrees centigrade. The glass-bonded ferrite body is thus shown in the photograph of Fig. 7.

Figure 8:
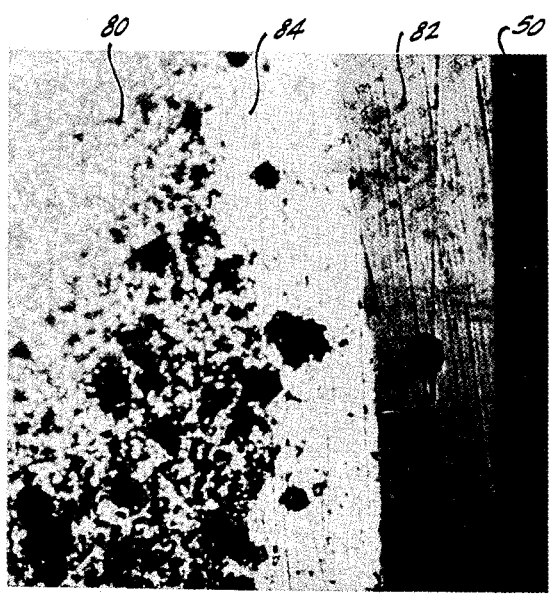
Fig. 8 is a photomicrograph of a ferrite body illustrating how glass soaks into a porous ferrite.
Figure 9:
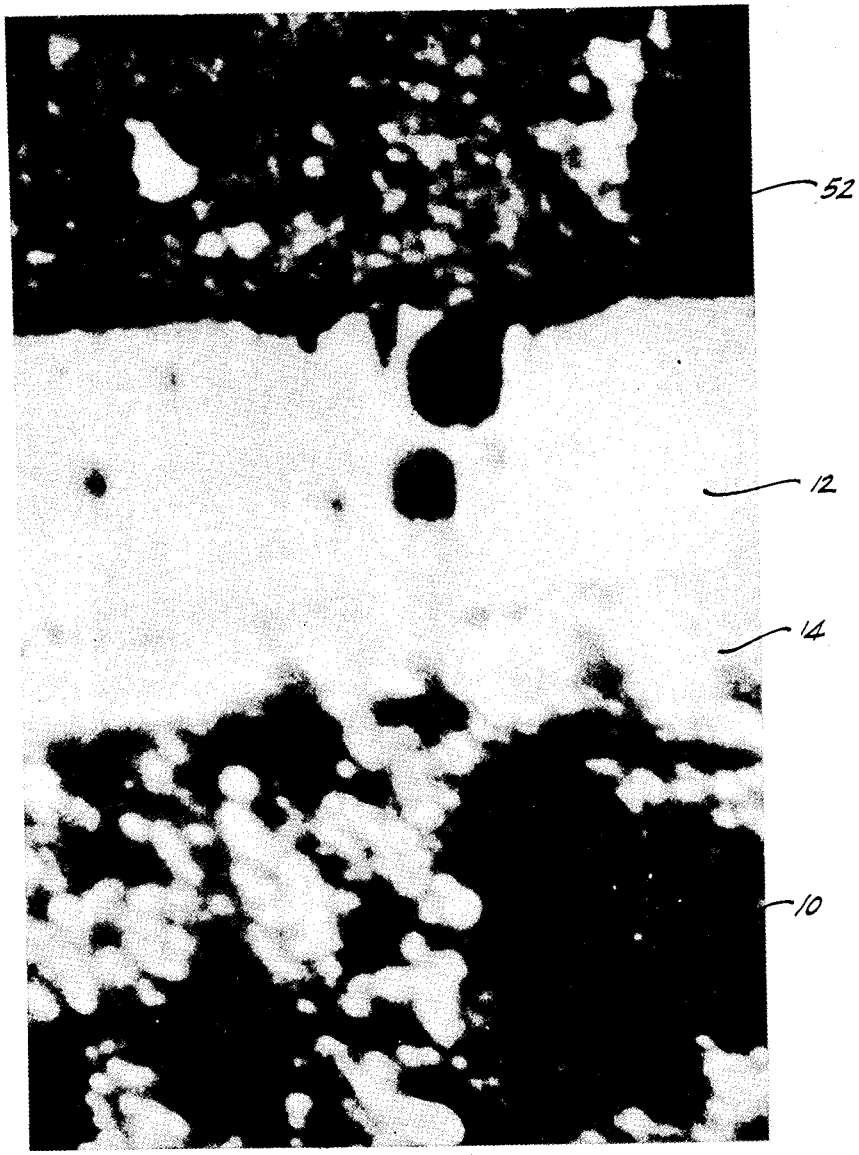
Fig. 9 is a photomicrograph of the glass to ferrite bond capable of being produced in accordance with the present invention.

The fact that glass will soak into a porous ferrite is shown in the photomicrograph of Fig. 8 where a porous ferrite body 80 has been coated with a glass 82 that has soaked into the ferrite body 80 at the layer 84. However, with the present invention the glass 12 is prevented from soaking into the ferrite body 10. This is clearly illustrated by the photomicrograph of Fig. 9 showing an enlarged sectional view of the ferrite body 10, the glass 12 and the sintered dielectric surface layer 14. The darkened portions 50 and 52 of the photomicrographs of Figs. 8 and 9 are background materials.

The structure of the present invention therefore comprises a ferromagnetic ferrite body, a sintered layer of a powdered dielectric and a sealing glass cover. The particular ferrite composition is chosen for its most desirable physical properties. The glass should "wet" the ferrite and the thermal expansion coefficient of the glass should "match" the thermal expansion coefficient of the ferrite. Many suitable glasses such as lime or lead glasses which are available have been suggested in the earlier Iversen application of which the present invention is a continuation-in-part. A typical lime glass has the following weight percentages composition: $SiO_2$—70.5, $Al_2O_3$—1.8, CaO—6.7, $Na_2O$—16.7, $K_2O$—0.8, and MgO—3.4; and a typical lead glass has the following weight percentages composition: $SiO_2$—56.5, $Al_2O_3$—1.5, PbO—29, CaO—0.2, $Na_2O$—5.6, $K_2O$—6.6, and MgO—0.6. A glass designated 8870 by the Corning Glass Works has an unusually high thermal expansion coefficient with an unusually low-loss factor. Since low-loss is the prime consideration in the present invention, it is obviously desirable to choose a glass having a low-loss factor and to flow the glass onto the ferrite with a minimum thickness. Heating the ferrite body 10 to an appropriate temperature may further serve to evaporate the glass suspending medium. A glass designated 7570 by the Corning Glass Works and sometimes called "solder glass" is a glass which exhibits certain satisfactory physical properties for sealing a ferrite in that it is desirable to use a glass having a sintering temperature below that of the dielectric powder 14, which Corning glass 7570 has.

Having chosen a particular ferrite composition, such as that used in ferrite bodies distributed under the trade name Ferroxcube 106 by the Ferroxcube Corporation, and a glass composition, such as Corning glass 7570, the only variable which remains to be determined in the manufacture of the glass bonded ferrite is the particle size of the ferrite powder. The particle size is the only variable because the dielectric layer 14 is generally so small that as long as the ferrite powder or dielectric material 14 has a low or equal loss and is non-conductive, its presence has little, if any, effect upon the magnetic properties of the ferrite body 10. The interface layer 14 may therefore be constituted of practically any dielectric material including the material of the ferrite body itself. The particle size, e. g. 5 microns, of the powdered dielectric material 14 should therefore be reduced to have a sintering time, e. g. 10 minutes, and temperature, e. g. 1000 degrees centigrade to additionally drive off occluded gases from the ferrite body 10 substantially below that which may produce a change in the original magnetic properties of the ferrite body itself. Sintering may also serve to evaporate the dielectric powder suspending medium. For this purpose, the sintering temperature may be defined as that temperature at which substantial fusion takes place. Sintering time may be defined as the time of heating required to sinter the dielectric powder.

The method that follows is a typical process of the present invention which may be employed to seal a porous ferrite without substantially increasing its loss:

(1) Apply a ferrite powder having a 5 microns particle size to a porous ferrite body by painting or spraying a suspension of the powder in water onto the external surface of the ferrite body as shown in Fig. 3.

(2) Sinter the ferrite powder and body in air at 1000 degrees centigrade for ten minutes.

(3) After allowing the ferrite body to cool, paint or spray a liquid suspension of Corning glass 7570 in water onto the sintered layer of the ferrite powder as illustrated in Fig. 4 using eight parts water to one part glass by volume.

(4) Flow the Corning glass 7570 by heating it to its sintering temperature, which may be between 550 to 750 degrees centigrade, for about ten minutes.

Alternatively methyl alcohol may be employed as the glass or ferrite powder suspending medium.

What is claimed is:

1. A glass-bonded ferrite structure comprising a ferrite body, a sintered substantially non-porous layer of a dielectric ferrite powder being less than 5 microns in particle size and disposed on the external surface of said ferrite body, and a soft glass fused over said sintered layer of ferrite powder.

2. A glass-bonded ferrite structure comprising a ferrite body, a sintered substantially non-porous layer of a ferrite powder being 1 to 5 microns in particle size and disposed on the external surface of said ferrite body, and a fused cover of solder glass disposed on said sintered layer.

3. The method of making a glass-bonded ferrite structure including a ferrite body, said method comprising the steps of applying a ferrite powder to the external surface of the ferrite body, the particle size of said ferrite powder being less than 5 microns to thereby permit the ferrite body to be heated to the sintering temperature of said ferrite powder without affecting the magnetic properties of the ferrite body, heating the ferrite body and said ferrite powder to the sintering temperature of said ferrite powder, applying a liquid suspension of a powdered soft glass to the sintered surface of said ferrite powder, and heating the ferrite body, said ferrite powder and said soft glass to the sintering temperature of said soft glass.

4. The method of making a glass-bonded ferrite structure including a ferrite body, said method comprising the steps of spraying a liquid suspension of a ferrite powder onto the external surface of the ferrite body, the size of the particles in the ferrite powder being of the order of one micron such that the sintering temperature of said ferrite powder is between the sintering temperature of the ferrite body and the sintering temperature of a soft glass, whereby the physical properties of said ferrite body may be maintained constant, heating the ferrite body and the ferrite powder to the sintering temperature of the ferrite powder, brushing a liquid suspension of a powdered soft glass onto the sintered surface of the ferrite powder, and heating the ferrite body, the ferrite powder and the soft glass to the sintering temperature of the soft glass.

5. The method of making a glass-bonded ferrite structure including a ferrite body, said method comprising the steps of applying a liquid suspension of a ferrite powder to the external surface of the ferrite body, the particles in said ferrite powder having a diameter less than 5 microns, heating the ferrite body and said ferrite powder in air to a temperature of approximately 1,000 degrees centigrade for ten minutes, applying a liquid suspension of solder glass to the sintered surface of the ferrite power and heating the ferrite body, the sintered ferrite powder and the glass to the sintering temperature of the glass.

6. The method of making a glass-bonded ferrite structure including a ferrite body, said method comprising the steps of: applying a liquid suspension of a low loss ferrite powder onto the external surface of the ferrite body, the particles of said powder being of such a size that the sintering temperature of said powder is between the sintering temperature of the ferrite body and that of a soft glass; heating the ferrite body and the ferrite powder to the sintering temperature of said powder whereby the magnetic properties of said ferrite body are maintained substantially constant during the sintering of the ferrite powder; applying a liquid suspension of a powdered soft glass to the sintered surface of the ferrite powder; and heating the ferrite body and the ferrite powder and the soft glass to the sintering temperature of said soft glass.

References Cited in the file of this patent

UNITED STATES PATENTS

| | | |
|---|---|---|
| 2,330,129 | Lucas | Sept. 21, 1943 |
| 2,568,881 | Albert-Schoenberg | Sept. 25, 1951 |

FOREIGN PATENTS

| | | |
|---|---|---|
| 620,009 | Great Britain | Mar. 17, 1949 |